(12) United States Patent
Chopard et al.

(10) Patent No.: US 11,231,237 B2
(45) Date of Patent: Jan. 25, 2022

(54) ASSEMBLY AND ARTICULATED PANEL, FOR THERMAL INSULATION

(71) Applicant: Hutchinson, Paris (FR)

(72) Inventors: Fabrice Chopard, Paris (FR); Paul Bline, Paris (FR); Cédric Huillet, Paris (FR); Boris Chauvet, Paris (FR); Nadine Poupa, Paris (FR); Christophe Dominiak, Paris (FR)

(73) Assignee: Hutchinson, Paris (FR)

( * ) Notice: Subject to any disclaimer, the term of this patent is extended or adjusted under 35 U.S.C. 154(b) by 630 days.

(21) Appl. No.: 15/753,755

(22) PCT Filed: Aug. 19, 2016

(86) PCT No.: PCT/FR2016/052098
§ 371 (c)(1),
(2) Date: Jul. 12, 2018

(87) PCT Pub. No.: WO2017/029461
PCT Pub. Date: Feb. 23, 2017

(65) Prior Publication Data
US 2018/0313613 A1   Nov. 1, 2018

(30) Foreign Application Priority Data
Aug. 20, 2015 (FR) ...................................... 1557835

(51) Int. Cl.
F28D 20/00 (2006.01)
F28D 20/02 (2006.01)
(Continued)

(52) U.S. Cl.
CPC .......... *F28D 20/021* (2013.01); *F16L 59/065* (2013.01); *F24H 1/182* (2013.01);
(Continued)

(58) Field of Classification Search
CPC ...... F28D 20/021; F28D 20/02; F28D 20/023; F28D 20/026; F16L 59/065; F24H 1/182;
(Continued)

(56) References Cited

U.S. PATENT DOCUMENTS 4,491,172 A * 1/1985 Hitchin ................. F28D 20/021
165/10
4,977,952 A * 12/1990 Schatz .................. F28D 20/021
165/10

(Continued)

FOREIGN PATENT DOCUMENTS

DE    3245027 A1 * 6/1984 .......... F28D 20/021
EP    0 302 273 A1   2/1989
(Continued)

*Primary Examiner* — Harry E Arant
(74) *Attorney, Agent, or Firm* — Blank Rome LLP (57) ABSTRACT

An assembly having a structure provided with an interior volume in which is present for example at least one fluid capable of circulating in said volume and under the action of circulation means. Thermally insulating elements of VIP construction are arranged around a layer containing a PCM and extending around the peripheral wall that surrounds the volume. Protrusions fixed to the peripheral wall delimit spaces in which the thermally insulating elements are positioned. A sleeve extends around the protrusions and the insulating elements.

14 Claims, 8 Drawing Sheets

(51) Int. Cl.
   *F24H 1/18* (2006.01)
   *F28F 3/12* (2006.01)
   *F16L 59/065* (2006.01)

(52) U.S. Cl.
   CPC ........... *F28D 20/02* (2013.01); *F28D 20/023* (2013.01); *F28F 3/12* (2013.01); *F24D 2220/08* (2013.01); *F24D 2220/10* (2013.01); *F28F 2270/00* (2013.01); *F28F 2280/105* (2013.01); *Y02E 60/14* (2013.01)

(58) Field of Classification Search
   CPC .... F28F 3/12; F28F 2270/00; F28F 2280/105; F24D 2220/10; F24D 2220/08; Y02E 60/145; A61F 7/02
   See application file for complete search history.

(56) References Cited

U.S. PATENT DOCUMENTS

| | | | | |
|---|---|---|---|---|
| 5,316,171 | A * | 5/1994 | Danner, Jr. | B65D 90/022 220/592.21 |
| 2004/0194908 | A1 * | 10/2004 | Tomohide | F28D 20/021 165/10 |
| 2011/0100583 | A1 * | 5/2011 | Freund | F28D 17/02 165/10 |
| 2013/0062355 | A1 * | 3/2013 | Shulman | B65D 75/002 220/592.01 |
| 2016/0201995 | A1 * | 7/2016 | Oliva Llena | F28D 20/026 165/10 |

FOREIGN PATENT DOCUMENTS

| | | |
|---|---|---|
| GB | 2 455 748 A | 6/2009 |
| JP | 2006-183943 A | 7/2006 |
| JP | 2010-84813 A | 4/2010 |

\* cited by examiner

ASSEMBLY AND ARTICULATED PANEL, FOR THERMAL INSULATION

The present invention particularly relates to, for thermal insulation, an assembly comprising at least one first and at least one second thermally insulating material within a panel (of vacuum insulating panel construction; VIP).

A phase change material (PCM) may also be contained in the structure under vacuum (VIP). For any purpose, it is specified that a PCM designates a material capable of changing physical state within a restricted temperature range. Heat transfer (or thermal transfer) can be achieved by using the Latent Heat (LH) thereof: the material can then store or transfer energy by a mere change of state, while maintaining a substantially constant temperature, that of the change of state.

As for the VIPs, they are thermal insulators in which an insulating core, typically made of porous material, e.g. a silica gel/powder pressed into a plate, surrounded, under vacuum, by a gas-tight wrapping sheet, e.g. made of plastic and/or laminated aluminium. The vacuum obtained, typically with a residual pressure ranging from $10^{-3}$ to $10^4$ Pa, may allow decreasing the thermal conductivity to 0.02, if not less than 0.01 W/(m·K) approximately in the conditions of use. A 3 to 10 times greater insulation efficiency than that of more conventional insulating materials can thus be achieved.

Under "vacuum" will cover the case of structures under a "controlled atmosphere" where the volume concerned will be filled with a gas having a thermal conductivity lower than that of ambient air, 26 mW/m·K thus with an effect comparable to that of a certain vacuum. The porosity of thermal insulators is no longer essential.

"Porous" shall designate a material having interstices enabling the passage of air. The porous materials, with open cells, therefore include foams but also fibrous materials (such as glass wool or rock wool). The passage interstices that can be qualified as pores have sizes less than 1 or 2 mm so as to be able to guarantee a good thermal insulation, and preferably less than 1 micron, and more preferably less than $10^{-9}$ m (nanoporous structure), in particular for questions of resistance to ageing and therefore possible lower negative pressure in the VIP enclosure.

In addition, the industry is urged to speed up the time to market of new technologies that can reduce pollutant emissions, smooth any occasional increases in loads compared to a dimensioning nominal operation, but also propose solutions for shifting the return of available energy to another time. And yet, neither PCMs nor VIPs alone seem to be able to meet market expectations.

Their implementation in the field is problematic, especially their conditioning.

It is in this context that is proposed here an assembly comprising:
  at least one structure provided with a peripheral wall and having at least one interior volume in which there is at least one of the following:
    (at least one) a refrigerant fluid or heat transfer fluid capable of circulating in said volumes under the action of circulation means,
    elements for storing and releasing thermal energy,
    at least one element to be maintained at a certain temperature, and/or
    at least one element releasing heat,
  thermally insulating elements of VIP construction, thus contained in structures under vacuum and extending around said peripheral wall,
  at least some amongst (some of) retaining protrusions and retaining spacers held opposite the peripheral wall, two protrusions or spacers defining between one another, laterally and around the peripheral wall, an open space where at least one of the structures under vacuum is disposed, and
  a sleeve extending around the protrusions or spacers, and around the structures under vacuum, so as to retain the latter in said spaces extending between the sleeve and said peripheral wall.

In such a solution with protrusions or retaining spacers, it is even proposed that these protrusions are held in place opposite the peripheral wall by shapes cooperating with each other, which will facilitate mass production and assembly and even disassembly for maintenance.

The term "sleeve" covers both structures that are at least open at one end, such as the one hereinafter referred to as 38, and structures forming a housing, for example two complementary half-shells.

In particular in connection with the use of a said fluid circulating in a store-exchanger contained within the limits of a said peripheral wall and consisting of a series of generally planar modules stacked in layers (FIG. 15 or 17 below) it is proposed that the protrusions or spacers be defined by lugs projecting from the peripheral wall and engaged with blocks of thermal insulation.

For example, merely twisting plate corners into bunches will suffice to easily make such projecting lugs that are ready to engage into slots on the blocks, which may then form structural pillars.

In addition or alternatively, it is proposed that the protrusions or spacers are always defined by blocks with thermal insulation, but engaged either with at least some of said insulating structures under vacuum, or with spacers.

In fact, it will then be possible (as for example in the solution shown in FIG. 16 below) to produce said insulating structures under vacuum in the form of nested bricks having protrusions into which slots of blocks with thermal insulation may be engaged, which may once again form structural pillars.

Preferably, the protrusions or spacers will contain a thermally insulating material.

And to further facilitate mass production and assembly, and even disassembly for maintenance, it is proposed that the bodies have corners and that the protrusions or retaining spacers are like rods in sections extending in the corners and, as the sleeve, along several bodies of successively stacked modules (examples FIG. 15 or 17 below).

A limit of the above solution with protrusions or spacers and insulating pockets inserted between two such protrusions or spacers is the discontinuity that is caused.

Therefore, as an alternative, an assembly comprising the following is proposed:
  at least one structure provided with a peripheral wall and having at least one interior volume in which there is at least one of the following:
    a refrigerant or heat transfer fluid capable of circulating in said volume(s) under the action of circulation means,
    elements for storing and releasing thermal energy,
    at least one element to be maintained at a certain temperature, and/or
    at least one element releasing heat,
  a series of closed pockets of VIP construction (under vacuum):
    individually containing at least one thermally insulating element, extending around said external wall, and
joined by flexible intermediate portions where two successive pockets can be articulated with respect to each other, and
a sleeve extending around said series of pockets so as to retain the pockets between the sleeve and said peripheral wall.

If such a solution with a continuous outer enclosure is selected, to combine a practical positioning of this enclosure and an optimisation of its thermal insulation by limiting the thermal bridges, it is furthermore proposed:

that at least some of the intermediate articulating portions comprise the following:
a tubular part (of circular cross-section or not) defined by a thermally insulating winding or by a unit enclosing a porous thermally insulating material in a tubular chamber under vacuum, and
two parts of flexible (or deformable) sheets, each interposed between said tubular part and one of said pockets,
that, externally, said peripheral wall has clamps on which said tubular parts are disposed.

Favourably, in this solution with a continuous outer enclosure, it is also advisable that the aforementioned series of pockets and said intermediate portions together define an articulated panel closed on itself.

Manufacturing such a panel in a horizontal position and then closing it on itself should allow for an easy implementation of the solution "with pockets".

Moreover, one object of the invention is formed by such panels in themselves, with pockets and intermediate portions including all or part of the aforementioned characteristics.

Now, regarding the destinations of the preceding embodiments, one is in particular detailed below as a preferred example, the purpose being to enhance its performance in a context of industrial mass production.

The production of a unit for storing and subsequently releasing thermal energy is thus proposed in particular according to one of the embodiments shown in FIGS. 1, 15 and following.

If necessary, the invention will be better understood and other characteristics, details and advantages thereof will further appear upon reading the following description given by way of non-limiting example and in reference to the appended drawings, wherein.

Figure 2:
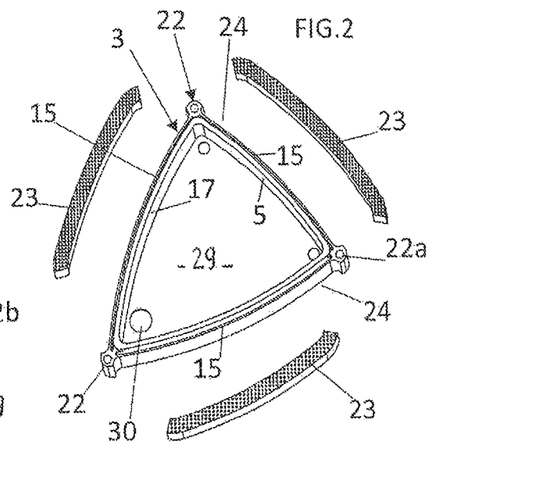
FIG. 2 shows, in an exploded view, one of its modules surrounded by blocks having thermal insulation not yet wrapped.
Figure 5:
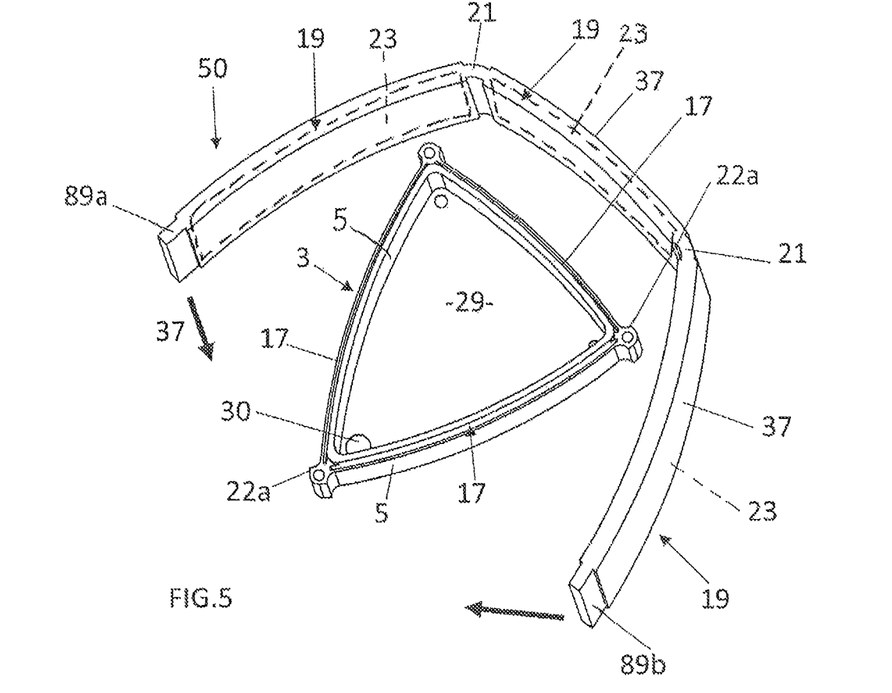
FIG. 5 shows an alternative embodiment of the peripheral pockets, not unlike a continuous articulable panel.
Figure 8:
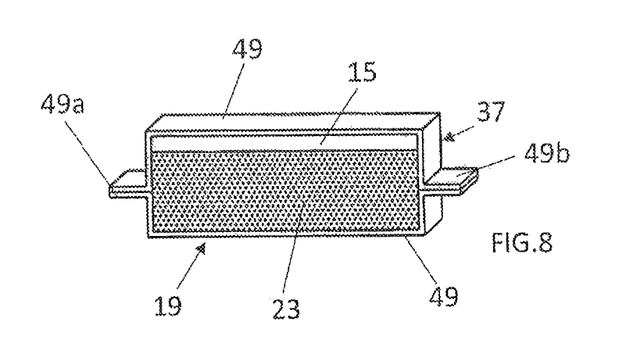
FIGS. 8 and 9 schematically show, in a local view (to be extended on either side in the case of an articulable panel), two possible structures of insulating pockets.
Figure 9:
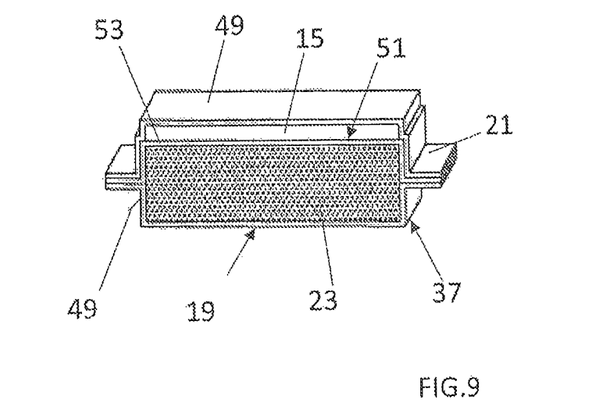

Although other applications may be considered (e.g. liquid-liquid exchanger, evaporator, or condenser), the diagrams in FIGS. 1, and 4 to 6 taken together show a thermal energy store-exchanger unit 1 that comprises the following:

at least one, in this case several, structures 3, each provided with a peripheral wall 5 and a bottom 29 and having an interior volume 7, in which in this case a refrigerating or heat-transfer fluid 9 is present that is able to circulate in said volumes under the action of circulation means 11, and elements 13 for storing and releasing thermal energy, at least one layer 15 containing a PCM that can be arranged in the peripheral wall 5 (e.g. in at least one peripheral cavity 17 of this wall, as shown in FIG. 2 or 5) or around said peripheral wall, in particular in the enclosure(s) 37 shown in FIGS. 8 and 9, elements 19 with thermally insulating material 23 and of VIP construction (under vacuum) arranged around the layer 15 and extending around the peripheral wall 5, protrusions forming retaining spacers 22, attached with the peripheral wall(s) 5, two protrusions delimiting between one another, laterally and around the peripheral wall, an open space 24 in which is arranged at least one of the thermally insulating elements 19 of VIP construction, and a sleeve or sheath 38 of mechanical protection open at both ends, for example made of hard plastic, that wraps the modules 3, the parts 32, 34, 36 and the pockets 19, which are thus interposed between the walls 5 and this sheath.

The peripheral wall 5 thus separates from the external environment (EXT) the volume 7, which it surrounds laterally, i.e. transversely to the direction (here 27) according to which the modules 3 are aligned or stacked.

Figure 4:
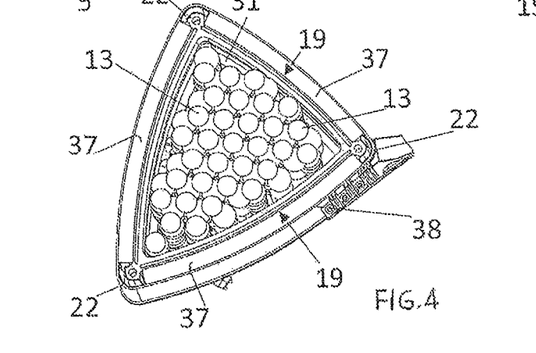

Extending around the protrusions 22 and the thermally insulating elements of VIP construction 19, the sleeve 38 contributes to retaining the elements 19 in the spaces 24, as shown in FIG. 4.

By "VIP construction" it is meant that a structure under partial vacuum (and therefore an airtight enclosure) may contain at least one thermally insulating material that could be microporous (pore sizes less than 1 micron) or even nanoporous (pore sizes less than $10^{-9}$ m).

The elements 19 will favourably be in the form of pockets.

The retaining protrusions 22 may be located in several parts. Thus, a solution wherein they are in two parts 22a, 22b can be seen in FIGS. 1 to 4. The portion 22b is removable and can be attached, by the shapes cooperating with one another, with the part 22a which is integral with the peripheral wall 5, in outer periphery thereof. The removable parts 22b may each be in the form of a clip or an end piece to be engaged by forced elastic deformation, or by lateral sliding, around the fixed part 22a. Said retaining parts 22b may be thermally insulating and contain for this a layer 23 made of thermally insulating material (which therefore may be of VIP construction, such as a pocket 19).

Typically, the modules or structures 3 will have corners and the retaining protrusions 22 will be in the form of rods extending into the corners, as illustrated.

Unlike the above, rather than therefore be hollow such as a clip, the removable part 22b could have a protrusion towards an outer hollow of the fixed part 22a to engage with. Other possibility: the two parts 22a, 22b would form only one to define a protrusions that is integral with the wall 5 so as to define a space 24 between two such peripherally successive integral protrusions.

The peripheral walls 5 and bottoms of the modules or structures 3, which in principal are integral, may in particular be made of elastomer, of a more rigid polymeric material (e.g. medium or high-density polyethylene), or of composite (filled with fibres), or even of metal.

Passages 30 communicating at least two by two, in the bottoms 29, enable the fluid 9 (which may be water or oil, or even a gas, such as air), to circulate, from an inlet 33 to an outlet 35, between the modules or structures 3.

Where this is necessary, since the open structures 3 can be arranged in particular back to back (FIG. 1) or conversely face to face, one or more covers 32, in this case two doubled up, close the openings 31 so as to seal each volume 7. Externally, each cover 32 may be lined by a single pocket 34 of VIP construction. And a mechanical protection plate 36 may close the whole, along the axis 27, as illustrated. The inlet 33 and outlet 35 pass through the parts 32, 34, 36 to lead into the respective volumes 7, as shown in FIG. 1. And a mechanical protection sheath 38 open at both ends, e.g. made of hard plastic, wraps the modules 3, the parts 32, 34, 36 and the pockets 19, which are thus interposed between the walls 5 and this sheath.

Figure 1:
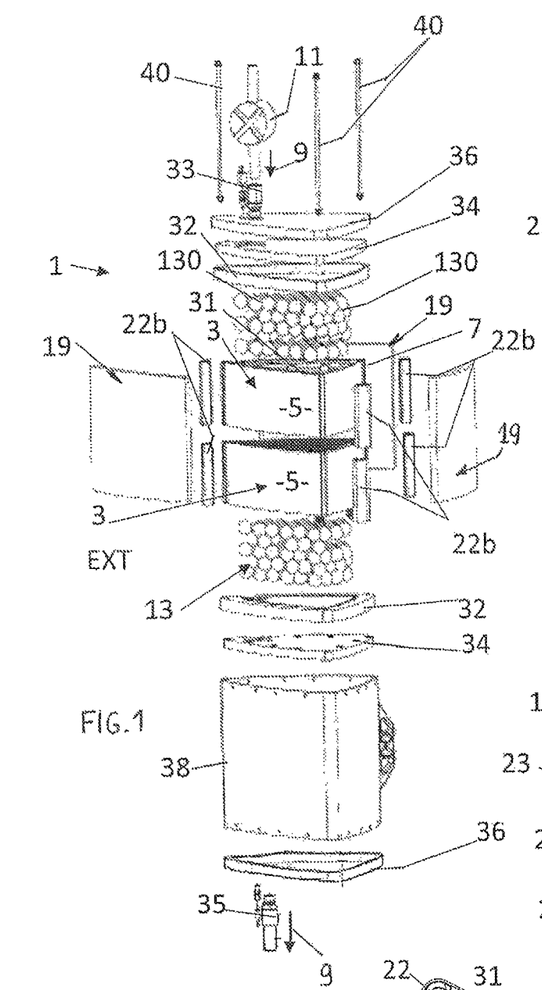
FIG. 1 is a diagram of a thermal energy store-exchanger unit, in an exploded view.

In the example shown in FIG. 1, the solution consists of two structures 3, stacked along the axis 27, which is perpendicular to their respective bottoms 29 that close the structures, transversely to the peripheral wall 5 and axially opposite an opening 31.

Fastening means 40, such as axial tie rods, will be preferably provided to engage with the modules or structures 3 in order to provide a fastening between these bodies placed in contact and facing each other. After that, the sleeve 38 will be externally put in place. For sealing against the fluid 9 flowing between the bodies, a seal 41 (e.g. FIG. 3) will be preferably provided around each volume 7 and interposed between two module bodies. An alternative would be, for example, to bond the module bodies together.

In the example, the assembly 1 thus is of modular construction, which should allow limiting the weight and/or the overall volume of the assembly.

In addition, the thermal performance of the PCMs is recognized. And a local PCM/thermal insulation complex, preferably under a VIP construction, will combine the following:
 a thermal insulation between modules, and
 a capacity for smoothing the temperature variations of the fluid 9 flowing through the store-exchanger 1 and/or (via the PCM) the elements present in the interior volume of the module under consideration.

The thermally insulating material 23 of each thermally insulating pocket 19, preferably of VIP construction, will not be a PCM, but an insulator such as glass wool, polyurethane or polyisocyanurate foam, or even more favourably a porous thermally insulating material, such as a nanoporous silica, disposed in a vacuum chamber, to define at least one such vacuum insulation panel (VIP).

In the example shown in FIG. 1, the (in this case each) interior volume 7 thus contains elements 13 for storing and subsequently releasing thermal energy with which the refrigerant or heat transfer fluid 9 comes into a heat exchange relationship.

A rubber compound as described in EP2690137 or in EP2690141 may be provided as a structure of the elements 13 (or 15 or 81 below), i.e. in the second case a cross-linked compound based on at least one room temperature vulcanized (RTV) silicone elastomer and comprising at least one phase change material (PCM), said at least one silicone elastomer having a viscosity measured at 23° C. according to standard ISO 3219 that is less than or equal to 5000 mPa·s.

In said compound, the elastomer matrix will mainly consist (i.e. based on an amount greater than 50 phr, preferably greater than 75 phr) of one or several "RTV" silicone elastomers. Thus, said compound could have the elastomer matrix thereof including one or more silicone elastomers based on a total amount greater than 50 phr and optionally one or several other elastomers (i.e. other than "RTV" silicones) based on a total amount of less than 50 phr. The thermal phase change material (PCM) consists of n-hexadecane, eicosane or a lithium salt, all having melting points below 40° C.

The PCM of the aforementioned elements could be based on fatty acid, paraffin, or eutectic or hydrated salt. There are other possibilities, such as a PCM impregnated in a porous network.

In principle, the elements 13, in this case individualised, such as the balls or spheres mentioned, will be arranged loosely in the volumes 7. The size ratio of the individualised structures/dimensions of each sub-volume will therefore be defined accordingly, in order preferably to optimise the exchange surfaces of the elements 13/fluid 9.

In FIGS. 1 and 4 to 6, the peripheral insulating pockets 19 thus follow one another discontinuously around a wall 5. But a continuous embodiment is also provided, as for example FIG. 5, wherein the insulating pockets 19 are connected in pairs by flexible intermediate portions 21 where two successive pockets can be articulated with respect to each other.

Figure 6:
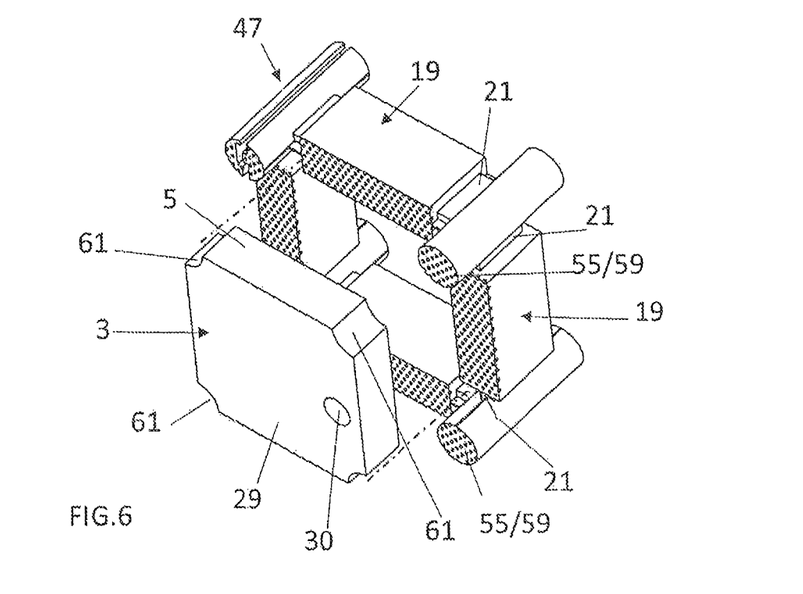
FIG. 6 schematically shows a cooperation via clamps for positioning between a peripheral wall to insulate and peripheral insulating pockets.
Figure 7:
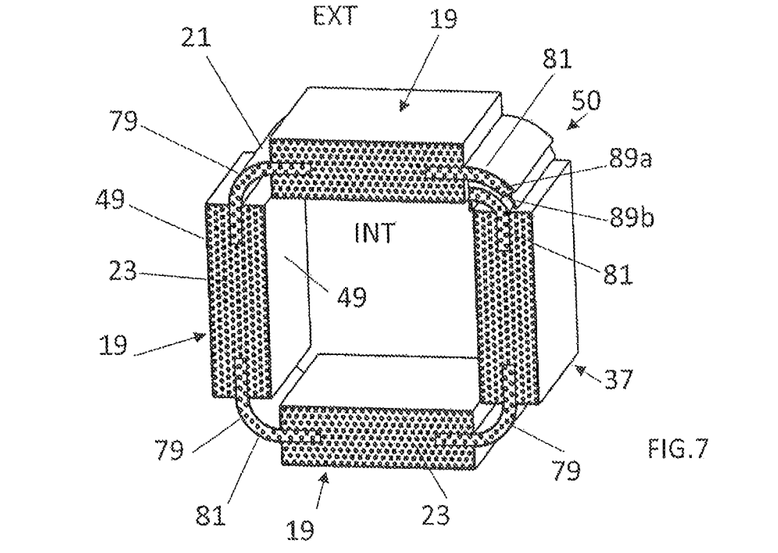
FIG. 7 schematically shows a closed state of an articulable panel with continuous insulation.
Figure 10:
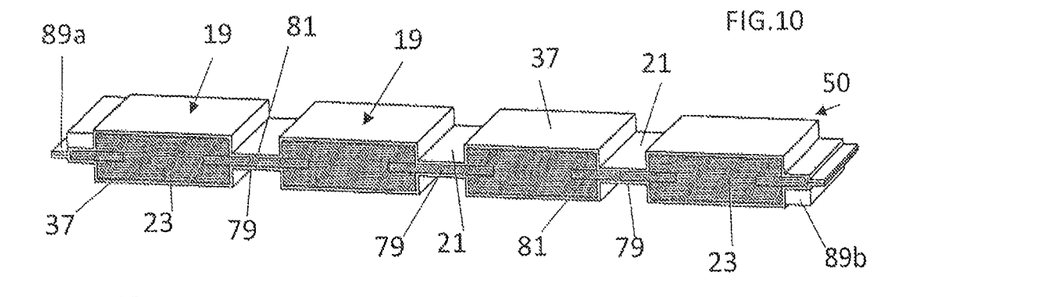
FIGS. 10 to 13 schematically show along partial strips of varying lengths of alternative embodiments of said pockets, in this case with of the intermediate articulating portions, through successive exploded views ending on the right with the assembled version, FIG. 14 schematically shows the outer lateral conditioning of a central element which may be a heat exchanger, and, FIG. 15 and following (16 to 18) are alternatives to the solution in FIG. 1, still in exploded views.
Figure 11:
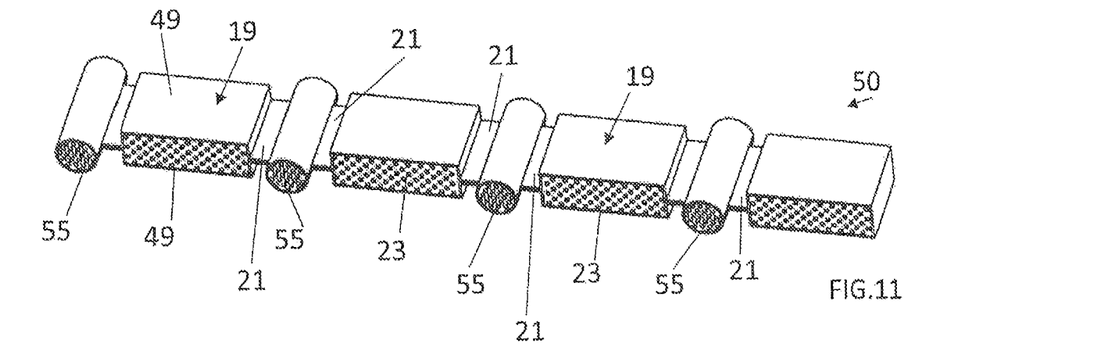

Although this is not strictly imposed (a shape closed on itself, such as a sleeve 47 being possible, as could be the case in FIG. 6), in principle, it will be preferred if the pockets 19 are continuously joined together so that these together define an articulable panel 50, as shown in FIGS. 5, 7 and 10 to 13, which can:
 typically in an operational state, be closed on itself (see FIG. 7, wherein the structure 50 is to be imagined to thus be arranged around a wall 5 to be insulated), and
 be deployed substantially flat, e.g. to be stored and in a state that may be non-operational (see FIGS. 10, 11).

Regardless of whether the embodiment of the pockets 19 is discontinuous or not, the following presents, in reference in particular to FIGS. 8 and 9, a favourable embodiment of these pockets and intermediate portions 21 if same exist. Thus, even if only one pocket 19 is shown, the model then merely needs to be reproduced on either side to continue the structure, if desired.

It can be seen that in these preferred embodiments, each pocket 19 of VIP construction must comprise (as shown in an exploded view in FIG. 3):
 at least one first element, or one first layer 15, containing the PCM, next to which (operationally outside) is arranged a second element consisting of said thermally insulating material 23, which will thus be porous in this case considering the VIP construction to be produced, and
 at least one closed outer enclosure 37 that contains the first and second elements and consists of at least one flexible or deformable sheet 49 and impervious to the PCM, with either of the following:

a) said flexible sheet 49 that furthermore is (thermally/chemically) sealable (in 49*a*, 49*b* around the pocket) and impervious to the porous material 23 and to air (or even also to water), so that an air gap prevailing in the enclosure 37, a so-called vacuum insulation panel (VIP) is thus defined, as shown in FIG. 8, b) the second thermally insulating element 23 contained within a second closed enclosure 51 with a flexible sheet 53 that is sealable and impervious to the porous material and to air (or event to water), so that an air gap prevailing in the second enclosure, a so-called vacuum insulation panel (VIP) is thus defined, as shown in FIG. 9.

Figure 12:
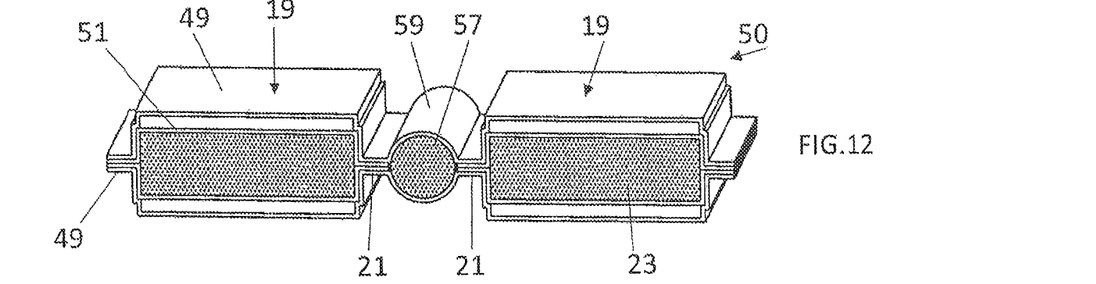
Figure 13:
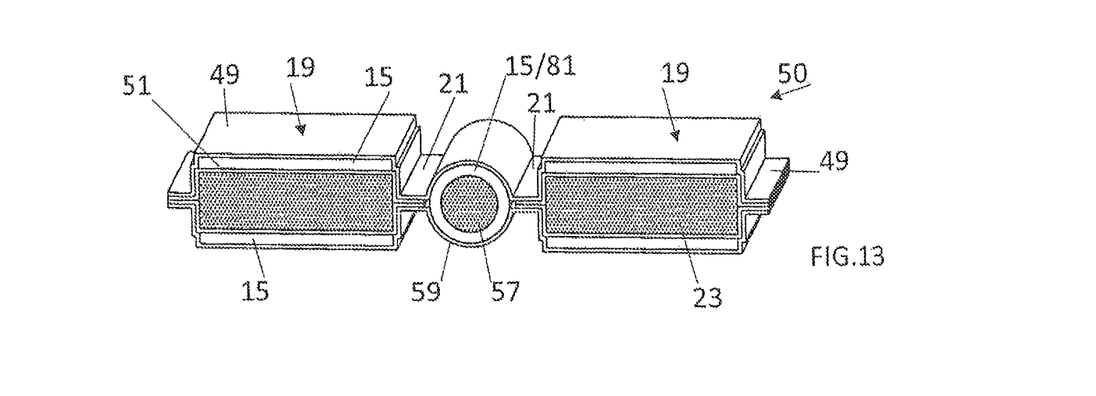

It should be noted that two layers 15 containing one or several PCMs could (as shown in FIGS. 12, 13) be arranged on either side of the layer of porous material 23, or even no such layer, if provided only in the wall 15, as shown in FIG. 2.

This thermal insulation 23 could also favourably be composed of a nanoporous material (with a nanostructure, such as a silica powder or an aerogel or its pyrolate, such as a silica aerogel), therefore preferably confined in a flexible sheet 49 or 53 that will not let through any water vapours or gas. The VIP obtained will be emptied of the air it contains to obtain, for example, a pressure of a few millibars, and then may be sealed. Typically, the thermal conductivity $\lambda$ of such a VIP will be 0.004/0.008 W/m·K at atmospheric pressure and at 20° C. The use of insulating panels under vacuum should allow for a thermal resistance R=5 m$^2$·K/W to be achieved with only 35 mm of insulating material.

The following is a possible composition of the material 23: 80-85% of silica dioxide (SiO2), 15-20% of silicon carbide (SiC) and possibly 5% of other products (binder/fillers). A thickness of 0.4 to 3 cm is possible. Examples, that can be applied here, of VIP and super-insulating material are furthermore provided in PCT/FR2014/050267 and in WO2014060906 (porous material), respectively.

The solutions presented above must enable, in an acceptable volume and weight in particular by aeronautical or automotive manufacturers, rapid storage of an available thermal energy after approximately 6-10 minutes, the retention of said energy for 12 to 15 hours, before the rapid release thereof, typically a few minutes (in particular less than 2-3 minutes), for example to an engine during a cold start phase.

The flexible sheets 49, 53 of the VIP may typically be made in the form of a multilayer film comprising polymer films (PE and PET) and aluminium in, for example, laminated (sheet of thickness of around ten micrometres) or metallised (vacuum deposition of a film of a few tens of nanometres) form. In case b) above where there is a double sheet: inner 53 and outer 49, the sheet 49 may, however, therefore only be a simple polymer film, such as a PE 0.05 to 0.2 mm thick, the object of this outer sheet 49 can then only be to create a simple bag for containing/joining together the elements or blankets 15 and 23.

It should also be noted that the/each enclosure 37, 51 may typically be formed of two sheets arranged on either side of said material element(s) 15 and 23 and joined together, as in 49*a*, 49*b* in FIG. 19.

Whatever the case may be, an advantage of the sheets directly in contact with one another where the intermediate portions 21 are located, as illustrated, if there are several, (or of the sheet if it is unique) is that advantage can be taken of the physical continuation thereof at the location of the portions 21 to create an articulation area therein.

However, the simple use of said flexible sheet(s) will create a discontinuity having thermal insulation between the two consecutive pockets 19 thus joined.

In some cases, the intermediate portions 21 could have significant surfaces that are all the more troublesome in terms of thermal bridges; but it may also be necessary to place a panel 50 or a sleeve 47 in support, for example to position same correctly in relation to its environment.

All the more in these cases, a benefit may be found in that a tubular part (whether its cross-section is circular or not), defined internally by a winding 55 or a bulged portion 59, is defined between two articulation areas 21 (each formed by the aforementioned flexible sheet(s) applied against one another), each area being itself joined laterally on one side to the pocket 19 concerned, this in a regular or irregular manner in the chain, as shown in FIGS. 11 to 13.

Each winding 55 will favourably be a blanket of thermal insulation. A nano-structured or nanoporous material, such as a silica aerogel, would be particularly suitable. It may, for example, be the blanket flexible product known as Spaceloft®, a SIAP (Super Insulation at Atmospheric Pressure) proposed by the company ISOLProducts with a thermal conductivity: A=0.0044 to 0.021 W/m·K at atmospheric pressure and at 20° C.

Moreover, each element 55, 59 will also be favourably wrapped in the aforementioned flexible sheet(s) (to keep a VIP construction). In addition or alternatively, this or these aforementioned flexible sheet(s) gathering two successive pockets 19 could wrap, directly or with interposition of a PCM layer 15 (FIG. 13), a porous thermally insulating material 57, which is identical to or different from the thermally insulating material 23 of the pocket(s) or of each pocket.

The windings 55 and the bulged portions 59 will favourably have a convex outer surface. This may therefore in particular allow a support against complementary external positioning surfaces 61 formed locally around the said peripheral wall 5, these surfaces 61 being concave, therefore each in the form of a clamp, if the portions 59 and/or the wrapped windings 55 are externally convex, as shown schematically in FIG. 6.

The outer surfaces 61 may also be located in particular at the concave or convex corner areas (see illustration), to then combine articulation and mechanical fastening, in the retaining or positioning direction. Spherical or cylindrical convex shapes should be useful.

Both in the solution with winding(s) 55 and in the one with bulged portion(s) 59, the intermediate portions 21 are not fully nor thermally insulating.

It may however be desirable to combine the functions of articulation between pockets 19 and having thermal insulation without, or with few, thermal bridges, the benefit of the solution whose principle is shown schematically in FIG. 10 being noted in relation to these questions of positioning or relative mechanical fastening.

In FIG. 10, the intermediate portions 21 are defined by at least one structure 79 with thermally insulating material 81 (preferably porous so as to be incorporated in an overall VIP structure), providing a continuity having thermal insulation between said two pockets. The material 81 may be identical to the porous thermally insulating material(s) 23, 57.

In the example in FIG. 10, the porous material (in this case, in the form of plates) 81 of each flexible structure 79 that extends along the thickness between the flexible sheet(s) 49 of the enclosure 37, is interrupted in the porous thermally insulating material 23, which fills the pockets 19. There could however be continuity within it.

As they are thicker than the impregnated fabrics, for example more than 2.5 to 3 times thicker, and for example formed in a block, as illustrated, the pockets 19 of thermally insulating material 23 will typically be stiffer than the flexible articulation structures 79.

In order for the panel 50 thus formed to acquire its VIP construction, under partial vacuum, of course such a vacuum will be established, with sealing, after the layers or plates of porous materials 23, 81 have all been wrapped by the flexible sealed sheets 49.

To produce the structures 79, it may be possible to use a flexible support made of a polymer mesh of a few mm thick impregnated with an organic aerogel 81, for example silica, or the pyrolate thereof (pyrolysed aerogel, it being specified that this alternative pyrolate applies to each case of the present description wherein a porous thermally insulating material is concerned). The flexible support will favourably be formed of a raw weft (e.g. an organic or inorganic woven or non-woven fabric), such as polyester or polyamide impregnated with aerogel insulating particles wedged between the fibres. which will allow for adequate flexibility to be preserved.

For the record, an insulation structure such as the one presented above 47, 50, having nanoporous aerogels or the pyrolate thereof as core material, may have a thermal conductivity lower than 10 mW·m−1·K−1 at an internal pressure of 2 to 5 to $10^{-3}$ Pa. The negative pressure within the pockets, or even within the portions 21, may be that usual for VIPs: $10^{-2}$ to $10^{-3}$ Pa.

Figure 3:
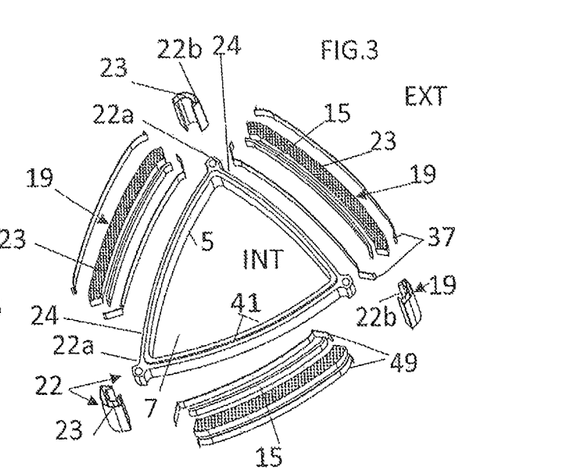
FIGS. 3 (again in an exploded view) and 4 (final assembled state) supplement FIG. 2.

In connection with FIGS. 3, 12, 13, it will further be noted, as already mentioned, that it may be advantageous that at least some pockets of VIP construction and/or areas of intermediate portions contain at least one PCM, said material 15 being identical to or different from same of the PCM elements 13.

If there is only one layer of said material 15, it will therefore be favourably surrounded by the material layer 23, at the location of the pockets 19, and by the material 81 if the flexible intermediate portions 21 are provided. By the way, in FIGS. 1, 3, 7, the side of the volume 7 has been marked INT and the exterior (environment outside the store-exchanger 1) has been marked EXT. Again, under the thermal cover of the pockets 19, or even also same of the intermediate portions 21, the heat production jolts within the volume(s) 7 will thus be regulated through the PCM layer 15.

In FIG. 7 or 10, it may again be noted in 89a, 89b, means for retaining the strip 50 on itself, once it is folded on itself. A solution using a clip, hook or Velcro™-type hook-and-loop fastener, or other may be imagined.

It should also be noted that the pockets 19 will not necessarily be strictly flat. Thus, a curved shape is possible, as shown in the example in FIG. 3.

Figure 14:
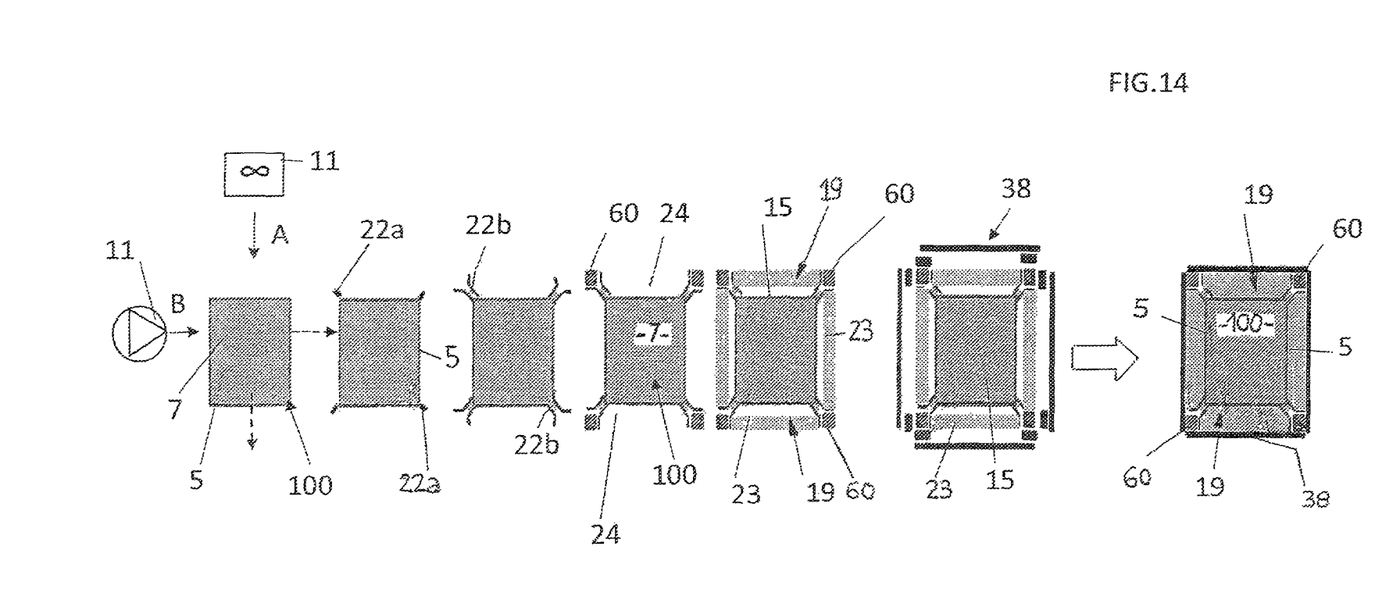

An application other than on a unit such as a store-exchanger, as in the case of FIG. 1, is schematically shown in FIG. 14, which shows the external lateral conditioning of an element 100, which can be a heat exchanger. Under the action of means 11 for circulating fluid(s), which may comprise a pump and/or a fan, a first refrigerant or heat transfer fluid A (such as a liquid to be cooled) can circulate within the interior volume 7, in this case of the exchanger 100, in a heat exchange relationship with a second fluid B (such as air), where the two fluids do not mix. The dotted lines show that they come out of the exchanger, typically to flow into a circuit that is external to the element 120 (e.g. a circuit for cooling the hydraulic fluid in a vehicle), like the fluid 9 coming out of the unit 1.

Additional retaining protrusions 22a, 22b, fastened with the peripheral side wall 5 of the element 100, protrusions be delimited between each another, two by two, laterally and thus around the peripheral wall, the open spaces 24 in which are disposed the pockets 19 of VIP construction each containing at least one porous thermally insulating element 23.

The layer containing a PCM will have been disposed either in a peripheral cavity of the wall 5 or around it; typically inside the pockets 19.

Stabilizing corners 60, possibly carrying a material 23, can supplement the retaining protrusions 22a, 22b in order to properly stabilise the pockets 19, all around the peripheral lateral wall 5, and to form with them the spacers allowing for the peripheral VIP pockets 19 to be mounted.

A sleeve 38 (consisting of one or several parts, as in this case) extends closely around the protrusions and the thermally insulating elements 23 of VIP construction, so as to retain the latter in the spaces 24.

Comparing the first and last diagrams in this figure will make it clear that, in fact, circulation of the fluids A, B can be achieved in faces other than those provided on the left in the figure, for example the upper and lower faces, with circuit layouts that still allow obtaining surfaces where a heat exchange between said fluids can take place.

Figure 15:
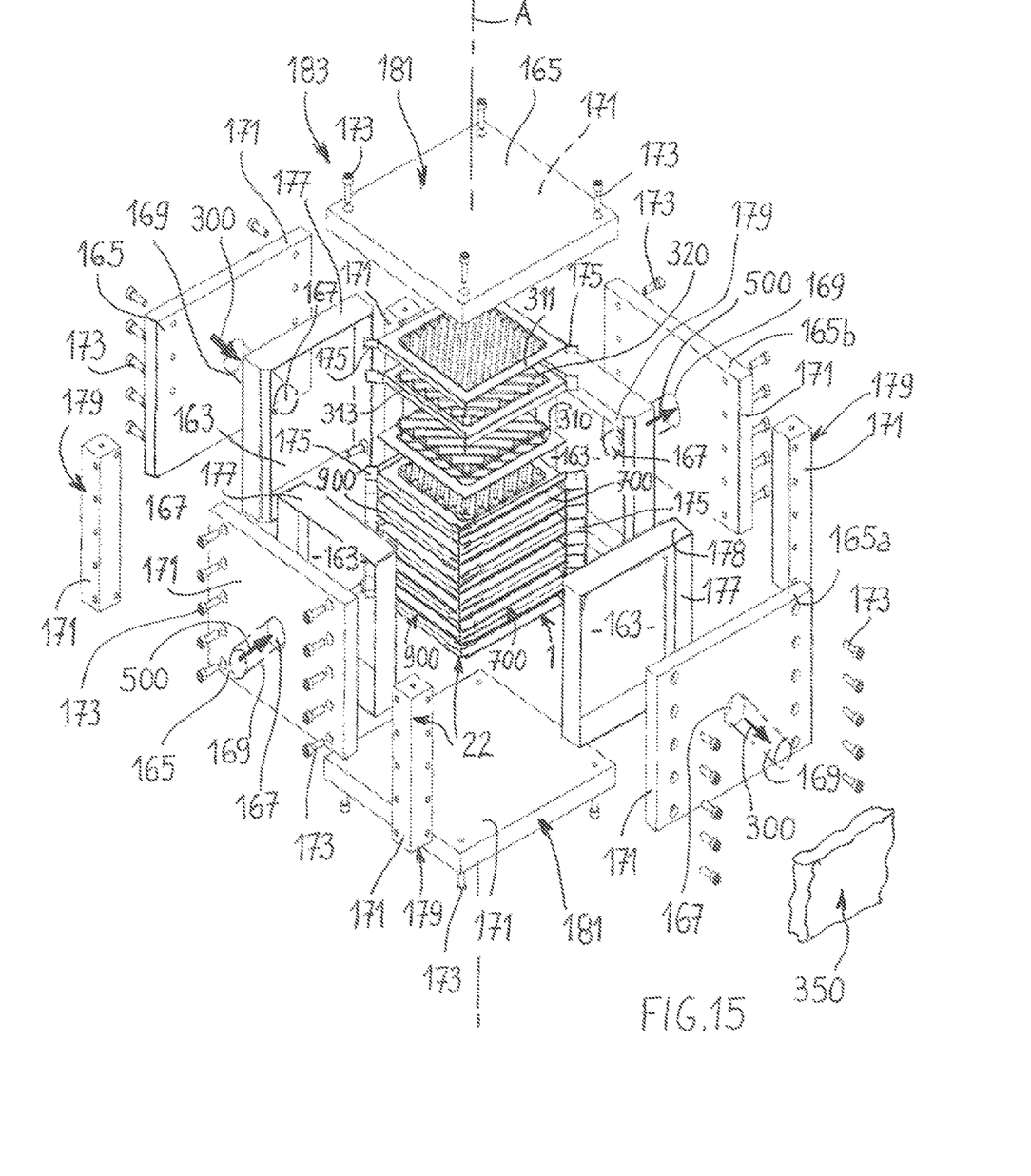

In the solution shown in FIG. 15, unlike that in FIG. 1, there is a store-exchanger 1 in which two fluids 300, 500 can circulate, without mixing one with another.

In the midst of the thermal management structure that will be presented, the store-exchanger 1 consists of a stack in a direction A of parallelepiped exchange and circulation plates 310, crossing from one level to the next, so as to define internal passages 700, 900 respectively between two levels of plates 310, for the successive circulation of one fluid 300 and then the next 500.

Each plate 310 may consist of two parallel-corrugated plates 311, 313 lying upon each other between at least some of which PCM 320 is interposed, itself being in the form of a plate, for example.

The fluids 300, 500 will therefore flow in the free spaces 700, 900 on one level of plates 310 out of two, in this case according to two transverse directions, each perpendicular to the axis A.

One collecting volume 163 per side face stands around this stack, as illustrated.

Each collecting volume 163, located opposite an opening at the end of each internal passage 700, 900, receives the fluid under consideration, in this case 300 or 500, to make it flow through the levels of the passage concerned, or that just flowed through same.

Thus, each series of passage levels 700 (respectively 900) is connected upstream (with respect to the direction of circulation of the fluid under consideration) with a first collecting volume 163 and, downstream, with a second collecting volume 163 located on the opposite side face.

Externally, each collecting volume 163 is limited by a side wall 165.

Each side wall 165 will preferably be traversed at 167 by an opening thus connecting with a collecting volume 163 to connect to a fluid 300 or 500 supply or discharge pipe 169.

Moreover, each side wall 165 will preferably contain a thermally insulating material 171.

Between two adjacent side faces, such as 165a, 165b, the collecting volumes 163 are fluidically isolated from each other.

To achieve this, each assembly of first and second plates 311, 313 comprises a projecting lug 175 in each lateral corner. To facilitate this, these plates may be metal, stampable and weldable.

The lugs 175 may usefully form, in each corner, an edge parallel to the stacking direction A, in this case vertical. To obtain the multi-level store-exchanger 1, the plates 311, 313 will therefore merely need to be welded together one on top of the other along, for example, overturned edges and vertical edges. We will thus obtain an alternation of free passages 700, 900, crossing one with another and closed on two opposite sides.

The final embodiment of the block will then pass through an interface with the sidewalls 165, for the peripheral sealing, and thus the insulation between the collecting volumes 163.

Rather than a direct engagement with these walls, what is proposed here is that the axial lines (thus vertical in this case) of lugs 175 fastened to each other engage between two, for example bevelled, vertical corners 178 of intermediate frames 177.

The intermediate frames 177 will then be interposed, laterally, between the stack of plates 310 and the opposite side wall 165.

In the lateral corners, pillars or risers 179 stand axially between two adjacent sidewalls 165, or, as in the example shown, between two adjacent lateral intermediate frames 177, the whole being then covered by the sidewalls 165.

Fastening means, such as screws 173, may unite the whole, in this case engaged in the sidewalls 165 and corner pillars 179.

Transversally to the axis A, in this case above and below, solid cover plates 181 are involved in closing, thus preferably sealed and thermally insulated, the collecting volumes 163. Like the walls 165, the plates 181 each preferably contain a thermally insulating material 171.

In fact, we recommend that (preferably all) these walls 165 and plates 181 consist of a VIP structure or pocket (see dotted lines on upper plate 181) and are therefore airtight. Thus, their interior volumes containing the thermal insulator(s) 171 will be under the controlled atmosphere established for example due to a peripheral welding of a plastic or metal enclosure containing this (these) thermal insulator(s) 171. The passages for the pipes 169 and screws 173 will then be sealed or external to the pockets.

The pillars 179 may not consist of VIP structure.

With the projecting lugs 175, these pillars 179 will thus define said protrusions or spacers 22 with which the pillars are in this case engaged, via slots 117, thus through cooperating shapes.

Once the whole is assembled and fastened, we obtain the operational housing 183 forming a thermally-efficient store-exchanger thus including internal circulation of fluids. One advantage of the VIP solution will be to limit the thickness of the insulation 171, especially if a porous insulator, such as an aerogel, is used, and thus either increasing the interior volume of the housing available for the exchanger or the overall volume of the housing. Better insulation and/or limited weight can also be expected. An additional mechanically protective enclosure or casing 350 may be found around the whole.

Figure 16:
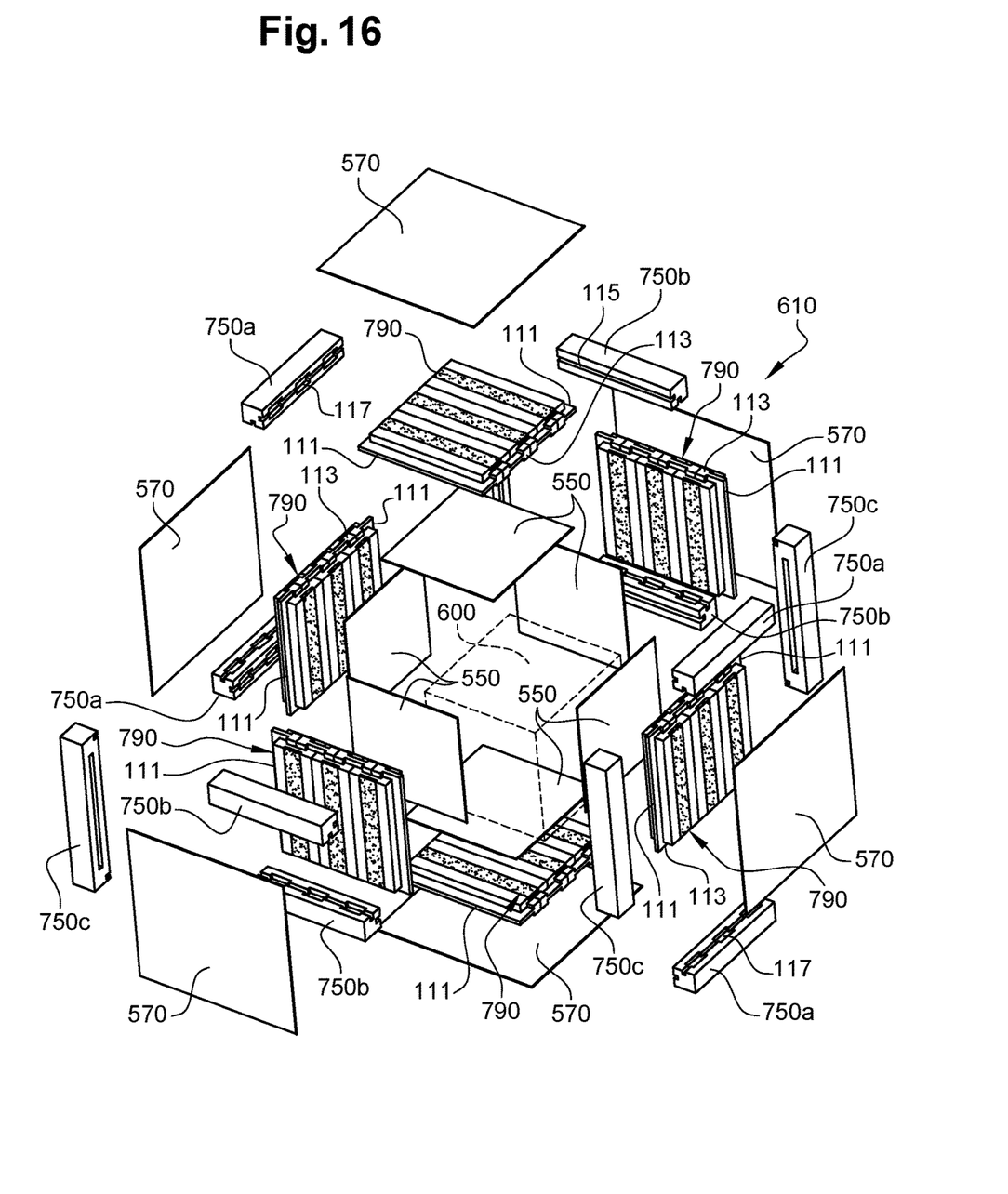

FIG. 16 shows a peripheral thermal insulation solution of one (or several) internal element(s) 600, for example an automotive electrical production battery in which intermediate walls (containing a PCM) between some of the battery's cells may be used to partly control its temperature.

A first enclosure consisting of an assembly, for example welded, of plates 550 may be found around the element 600. A closed plastic or metal casing may thus be defined. Another such casing, in this case closed, 610, may be formed at the outer periphery, defined by an assembly, for example welded, of plates 570.

Between the outer casing defined by the assembly of the plates 570 and the internal element 600, and even the inner casing in the example, in this case closed, formed by the assembly of the plates 550, are interposed said thermally insulating elements of VIP construction (hereinafter 750a, 750b, 750c, 790), this therefore around the peripheral wall formed either by the outside of the element 600 or by the casing with plates 550.

The shape of the slots differentiates the elements or plates 750a, 750b, 750c.

The sleeve 38 in FIG. 1 is in this case defined by the outer casing with plates 570. And the spacers that establish said open space, in which said thermal insulation elements of VIP construction (hereinafter 750a, 750b, 750c, 790) are disposed, are blocks or pillars 750a, 750b, 750c.

In the example, said thermally insulating elements of VIP construction are defined by VIPs each with a sealed metal enclosure containing, under controlled atmosphere, a porous thermal insulation.

On their edges and in their respective planes, these VIPs have projections 111, 113 that are suitable for being engaged in corresponding grooves, 115, 117 respectively, formed in the longitudinal faces of the blocks or pillars 750a, 750b, 750c.

The blocks or pillars 750a, etc. in this case define corner blocks for the parallelepiped created.

Thus, on each of its four edges, each VIP 750a, . . . , 790 is engaged with four blocks or pillars 750a, . . . , within its plane.

Once it is inter-engaged, the whole is self-wedging and self-supporting, especially since:

With blind grooves 115, 117, the end blocks 75a, 75b, . . . , will form a thermal insulation as the VIPs, by then blocking the path of the thermal bridges. In fact, their construction as a unitary block, without any separation for the thermal bridge paths, with bottoms with blocking grooves 115, 117 at which the paths of the panels' thermal bridges end up, in the plane of the panels, will reinforce the expected thermal insulation.

With a parallelepiped cross-section, these end blocks may each have, on two sides other than the ones with grooves, solid walls suitable for supporting the side plates 550, 570 internally and externally. Each panel 750a, . . . 790 may thus be clamped between these two side walls fastened with the end blocks.

Fastening with a layer of glue 77 or screws, for example, is possible.

Figure 17:
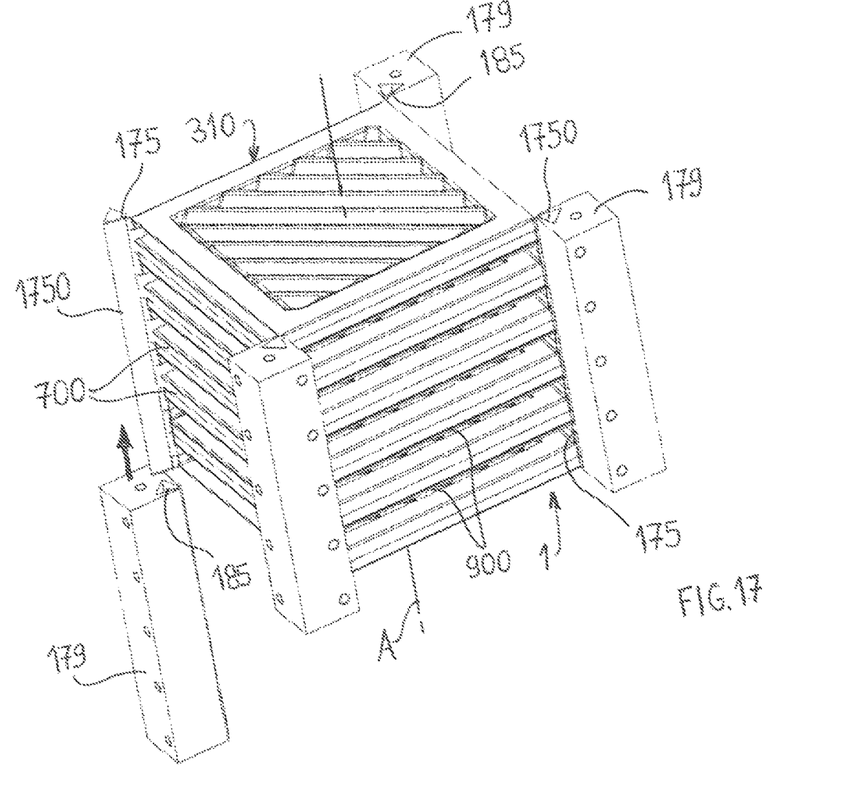
Figure 18:
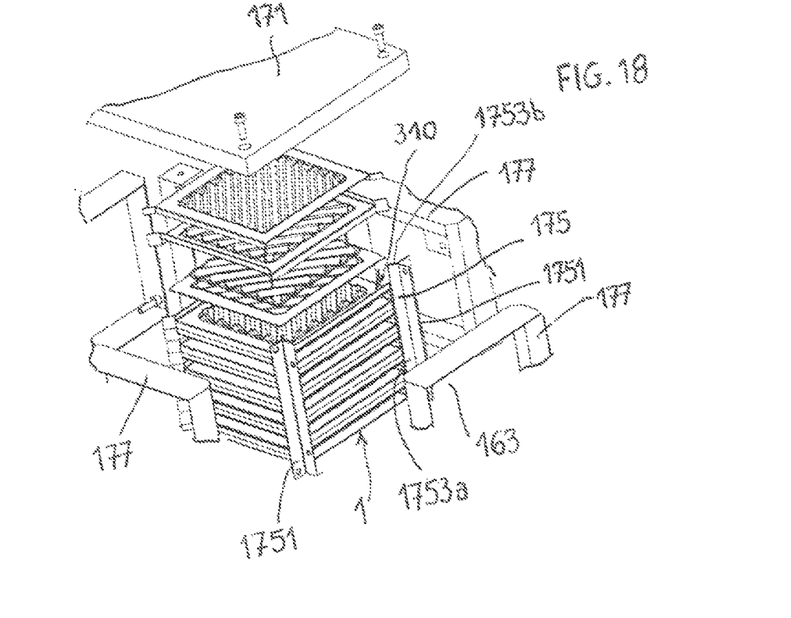

FIGS. 17, 18 are alternatives close to the solution shown in FIG. 15.

In FIG. 17, the corners, pillars or risers 179 each have a corner slot 185 that is open laterally and parallel to the axis A and each is engaged with a dovetail shape 1750 of the corresponding projecting lug 175. In the figure, the arrow shows the axial engagement of a shape 1750 in the slot 185 of a pillar 179.

In FIG. 18, in the corners, the projecting lugs 175 extend laterally with vertical angle sections 1751 open outward, integral or fastened to the same, and each receiving, in their V-shaped opening, a said pillar or parallelepiped riser 179 to be fastened to this angle section. With a double lug 1753a, 1753b forming a vertical slot extending opposite the opening of the angle section, each of the latter can itself engage around and along the lug 175 under consideration.

The invention claimed is:

1. A modular assembly comprising:
a plurality of structures configured as a plurality of stacked modules, each structure comprising a peripheral wall and having an interior volume, at least some of the plurality of structures containing a plurality of elements for storing and releasing a thermal energy by latent heat,
at least one of a refrigerant fluid and a heat transfer fluid capable of circulating in at least some of the interior volumes under the action of circulation means, in a thermal exchange with the elements for storing and releasing a thermal energy,
thermally insulating elements arranged around the respective peripheral walls, and
a plurality of retaining protrusions and/or retaining spacers, each of the plurality of retaining protrusions and/or retaining spacers extending away from the interior volume from a respective external corner of a respective peripheral wall,
wherein:
at least some of the thermally insulating elements are contained in a plurality of pockets under vacuum, each of the plurality of pockets arranged laterally around at least a portion of at least one peripheral wall and between two of said retaining protrusions or two of said retaining spacers extending from the at least one peripheral wall,
the modular assembly further comprises fixing means to fix the plurality of stacked modules outside the respective interior volumes, so that the respective interior volumes are in a fluid-tight relationship with respect to each other, and
the plurality of elements for storing and releasing a thermal energy are arranged in a patternless manner in the internal volumes.

2. The modular assembly of claim 1, wherein said a plurality of pockets under vacuum are joined by intermediate portions where two successive pockets can be articulated with one another, and the plurality of pockets and said intermediate portions together define an articulated panel that can be closed on itself.

3. The modular assembly of claim 2, wherein:
at least some of the intermediate articulating portions comprise:
a tubular part defined by a thermally insulating winding or by a portion enclosing a porous thermally insulating material in a tubular chamber under vacuum, and
two parts of flexible sheets, each interposed between said tubular part and one of said plurality of pockets, and
the protrusions comprise clamps for engaging said tubular parts.

4. The modular assembly of claim 1 defining a unit for storing and releasing thermal energy comprising:
a plurality of modules each comprising one said plurality of structures, each which comprise:
said plurality of elements for storing and releasing said thermal energy, which are individualised elements including at least one PCM,
a body comprising:
at least one of said interior volume being defined within said peripheral wall of the module and closed on one side by a bottom, while it is open on another side to be able to place within it or remove therefrom said plurality of elements for storing and releasing thermal energy,
at least one connecting passage between the outside of the body and the interior volume, to enable entry and exit of said at least one of the refrigerant and the heat transfer fluid.

5. The modular assembly of claim 1, wherein the retaining protrusions or retaining spacers are held in place with the peripheral walls by cooperating shapes.

6. The modular assembly of claim 1, wherein the thermally insulating elements comprise rods arranged in the corners along the plurality of stacked modules.

7. The modular assembly of claim 1, wherein the plurality of elements for storing and releasing a thermal energy comprises individualised balls.

8. The modular assembly of claim 1, wherein the thermally insulating elements comprise blocks and the protrusions comprise lugs for engaging said blocks.

9. The modular assembly of claim 8, wherein the engagements with the blocks comprise cooperating shapes.

10. The modular assembly of claim 1, wherein other of the thermally insulating elements than said at least some of the thermally insulating elements comprise blocks having thermal insulation engaged with at least some of said plurality of pockets under vacuum.

11. The modular assembly of claim 1, which further comprises at least one layer containing a phase change material (PCM):
arranged in at least one cavity of the respective peripheral walls or around said respective peripheral walls,
and around which are arranged at least some of said thermally insulating elements.

12. The modular assembly of claim 1, wherein the plurality of elements for storing and releasing a thermal energy include PCM.

13. A modular assembly comprising:
a plurality of structures, individually comprising a peripheral wall and having an interior volume, at least some of the plurality of structures containing a plurality of elements for storing and releasing a thermal energy;
at least one of a refrigerant fluid and a heat transfer fluid capable of circulating in at least some of the interior volumes under the action of circulation means, in a thermal exchange with the plurality of elements for storing and releasing a thermal energy; and
a plurality of thermally insulating elements arranged around the respective peripheral walls, wherein:
the plurality of structures are included in a plurality of stacked modules each comprising one of said plurality of structures, the plurality of stacked modules having corners, and projections extending from the corners of the respective peripheral walls and away from the interior volume,
the plurality of thermally insulating elements comprise:
plates each arranged laterally and around at least a portion of the peripheral wall and between two of the projections, and
in said corners, blocks individually arranged between two of said plates, and,
the modular assembly further comprises:
fixing means to fix the plurality of stacked modules, so that the respective interior volumes are in a fluid-tight relationship with respect to each other,
a first fluid supply pipe to supply simultaneously to a plurality of said interior volumes the at least one of a refrigerant fluid and a heat transfer fluid, and a first fluid discharge pipe to collect simultaneously from said plurality of said interior volumes the at least one of a refrigerant fluid and a heat transfer fluid.

14. The modular assembly of claim 13, wherein:

said at least one of a refrigerant fluid and a heat transfer fluid comprises a first fluid and a second fluid, the first fluid being capable of circulating in some of the interior volumes, the second fluid being capable of circulating in others of the interior volumes, in thermal exchange with the plurality of elements for storing and releasing a thermal energy and with the first fluid, with no mixing between the first fluid and the second fluid in the interior volumes, the first fluid supply pipe is adapted to supply simultaneously to a plurality of said interior volumes the first fluid, and the first fluid discharge pipe is adapted to collect simultaneously from said plurality of said interior volumes the first fluid, and, the modular assembly further comprises:
a second fluid supply pipe to supply simultaneously to another plurality of said interior volumes the second fluid, and a second fluid discharge pipe to collect simultaneously from said another plurality of said interior volumes the second fluid.

\* \* \* \* \*